(12) United States Patent
Lee et al.

(10) Patent No.: US 9,218,909 B2
(45) Date of Patent: Dec. 22, 2015

(54) MULTI-LAYERED CERAMIC ELECTRONIC COMPONENT

(71) Applicant: SAMSUNG ELECTRO-MECHANICS CO., LTD., Suwon, Gyunggi-do (KR)

(72) Inventors: Kyu Ha Lee, Gyunggi-do (KR); Eun Joo Choi, Gyunggi-do (KR); Hye Seong Kim, Gyunggi-do (KR); Byung Jun Jeon, Gyunggi-do (KR); Hyun Hee Gu, Gyunggi-do (KR); Jeong Ryeol Kim, Gyunggi-do (KR); Seung Hee Yoo, Gyunggi-do (KR); Chang Joo Lee, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 396 days.

(21) Appl. No.: 13/893,903

(22) Filed: May 14, 2013

(65) Prior Publication Data
US 2014/0146437 A1    May 29, 2014

(30) Foreign Application Priority Data

Nov. 26, 2012    (KR) .................... 10-2012-0134752

(51) Int. Cl.
*H01G 4/228* (2006.01)
*H01G 4/30* (2006.01)
*H01G 4/232* (2006.01)

(52) U.S. Cl.
CPC ............... *H01G 4/30* (2013.01); *H01G 4/2325* (2013.01)

(58) Field of Classification Search
USPC .......................................... 361/301.4, 306.3
See application file for complete search history.

(56) References Cited

U.S. PATENT DOCUMENTS

| 5,426,560 | A | * | 6/1995 | Amaya et al. ................. 361/309 |
| 8,248,752 | B2 | * | 8/2012 | Hur et al. ...................... 361/311 |
| 2010/0067170 | A1 | | 3/2010 | Koga |
| 2012/0154977 | A1 | | 6/2012 | Hur et al. |

FOREIGN PATENT DOCUMENTS

| JP | 11243029 A | * | 9/1999 |
| JP | 2010-073780 A | | 4/2010 |
| KR | 2012-0068622 A | | 6/2012 |

* cited by examiner

*Primary Examiner* — Eric Thomas
(74) *Attorney, Agent, or Firm* — McDermott Will & Emery LLP

(57) ABSTRACT

There is provided a multi-layered ceramic electronic component including a ceramic body including a dielectric layer, first and second internal electrodes disposed within the ceramic body so as to face each other, having the dielectric layer interposed therebetween, and a first external electrode electrically connected to the first internal electrodes and a second external electrode electrically connected to the second internal electrodes, wherein the first and second external electrodes include a conductive metal and glass and further include a second phase material occupying an area of 1 to 80% with respect to an area of glass in the first and second external electrodes.

12 Claims, 4 Drawing Sheets

A-A'

A-A'

A-A'

MULTI-LAYERED CERAMIC ELECTRONIC COMPONENT

CROSS-REFERENCE TO RELATED APPLICATIONS

This application claims the priority of Korean Patent Application No. 10-2012-0134752 filed on Nov. 26, 2012, in the Korean Intellectual Property Office, the disclosure of which is incorporated herein by reference.

BACKGROUND OF THE INVENTION

1. Field of the Invention

The present invention relates to a multi-layered ceramic electronic component capable of improving reliability by controlling fluidity of glass in an external electrode at high temperatures.

2. Description of the Related Art

In accordance with the recent trend for the miniaturization of electronic products, demand for a multi-layered ceramic electronic component having a small size and a high degree of capacitance has increased.

In accordance with the demand for a multi-layered ceramic electronic component having a small size and high capacitance, external electrodes of the multi-layered ceramic electronic component have also been thinned.

An external electrode paste contains a conductive metal such as copper (Cu) as its main material to thereby ensure chip sealing properties and electrical connectivity between an external electrode and a chip, and contains glass as an auxiliary material to thereby serve to provide adhesion between the external electrode and the chip simultaneously with filling voids at the time of sintering shrinkage of a metal.

In order to form a compact external electrode, a method of using copper powder having fine particles, a method of using a glass powder having fine particles, a method of increasing an electrode firing temperature, and the like, may be used.

However, in the case in which the fine copper powder is used, a contact property between the chip and the external electrode and compactness of the external electrode may be improved, but times required for reaching a firing initiation temperature and firing completion temperature are short, such that a blister defect generated since gas generated at relatively high temperatures after firing is not emitted may be generated.

Meanwhile, in the case of a low capacitance multi-layered ceramic electronic component, a surface state of an exposed nickel internal electrode after polishing may be degraded due to a relatively thick thickness of an internal dielectric layer, such that it may be difficult to form a copper-nickel alloy layer that should be formed at the time of forming the external electrode.

Therefore, it may be difficult to implement contact properties between a ceramic body and the external electrode, and in order to solve this defect, a firing temperature should be relatively high.

However, in the case in which the firing temperature is high, the glass may be softened before the copper-nickel alloy layer is formed such that it may move to a boundary surface between the ceramic body and the external electrode, whereby contact properties between the ceramic body and the external electrode may be deteriorated.

RELATED ART DOCUMENT

Korean Patent Laid-Open Publication No. 2012-0068622

SUMMARY OF THE INVENTION

An aspect of the present invention provides a multi-layered ceramic electronic component capable of improving reliability by controlling fluidity of glass in an external electrode at relatively high temperatures.

According to an aspect of the present invention, there is provided a multi-layered ceramic electronic component including: a ceramic body including a dielectric layer; first and second internal electrodes disposed within the ceramic body so as to face each other, having the dielectric layer interposed therebetween; and a first external electrode electrically connected to the first internal electrodes and a second external electrode electrically connected to the second internal electrodes, wherein the first and second external electrodes include a conductive metal and glass and further include a second phase material occupying an area of 1 to 80% with respect to an area of glass in the first and second external electrodes.

The second phase material may include at least one selected from a group consisting of barium (Ba), silicon (Si), zinc (Zn), and calcium (Ca).

The second phase material may have at least one of an acicular shape, a plate shape, a spherical shape, an oval shape, and an amorphous shape.

A content ratio of the glass to the content of the conductive metal may be 0.3 to 2.0.

The first and second external electrodes may include a conductive metal particle having an average particle size of 0.3 μm or less.

The conductive metal may be at least one selected from a group consisting of copper (Cu), nickel (Ni), silver (Ag), and sliver-palladium (Ag—Pd).

According to another aspect of the present invention, there is provided a multi-layered ceramic electronic component including: a ceramic body including a dielectric layer; first and second internal electrodes disposed within the ceramic body so as to face each other, having the dielectric layer interposed therebetween; a first external electrode electrically connected to the first internal electrodes and a second external electrode electrically connected to the second internal electrodes, wherein the first and second external electrodes include a conductive metal and glass and further include a second phase material occupying an area of 1 to 80% with respect to an area of glass in a central portion region when at least one of the first and second external electrodes is trisected in a thickness direction The second phase material may include at least one selected from a group consisting of barium (Ba), silicon (Si), zinc (Zn), and calcium (Ca).

The second phase material may have at least one of an acicular shape, a plate shape, a spherical shape, an oval shape, and an amorphous shape.

A content ratio of the glass to the content of the conductive metal may be 0.3 to 2.0.

The first and second external electrodes may include a conductive metal particle having an average particle size of 0.3 μm or less.

The conductive metal may be at least one selected from a group consisting of copper (Cu), nickel (Ni), silver (Ag), and sliver-palladium (Ag—Pd).

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
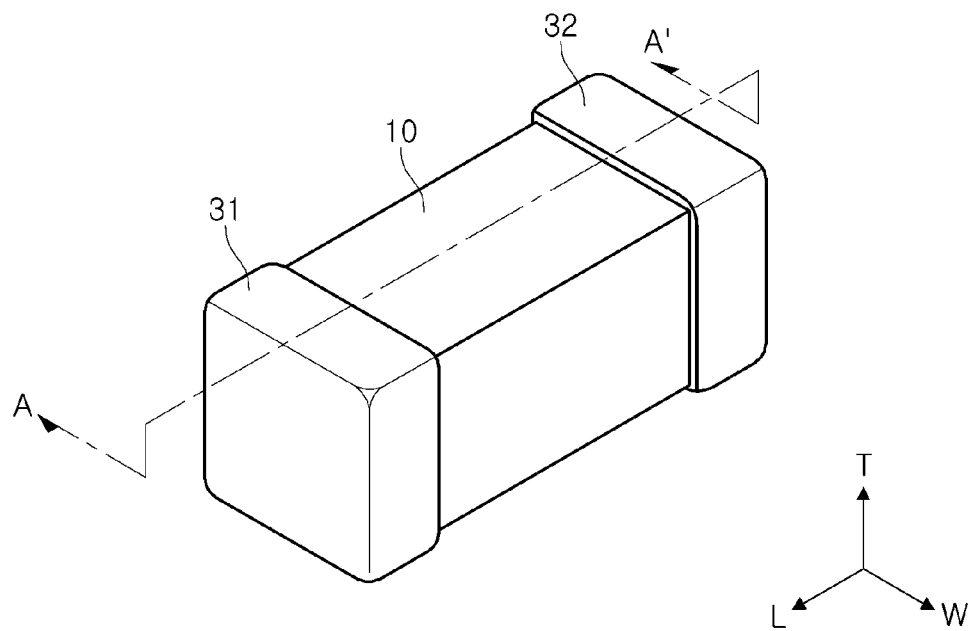
FIG. 1 is a perspective view schematically showing a multi-layered ceramic capacitor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a perspective view schematically showing a multi-layered ceramic capacitor according to an embodiment of the present invention.

Figure 2:
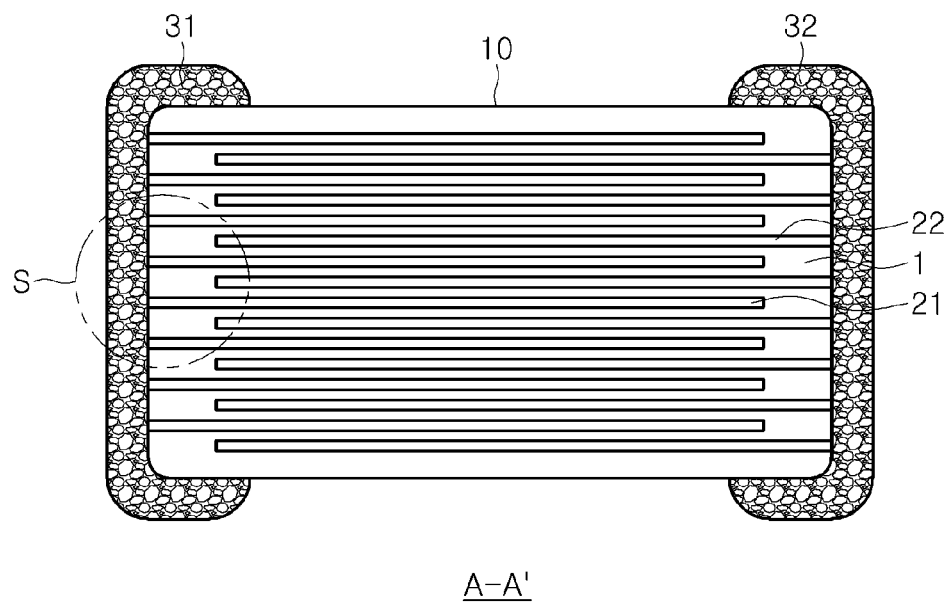
FIG. 2 is a cross-sectional view taken along line A-A' of FIG. 1.

FIG. 2 is a cross-sectional view taken along line A-A' of FIG. 1.

Figure 3:
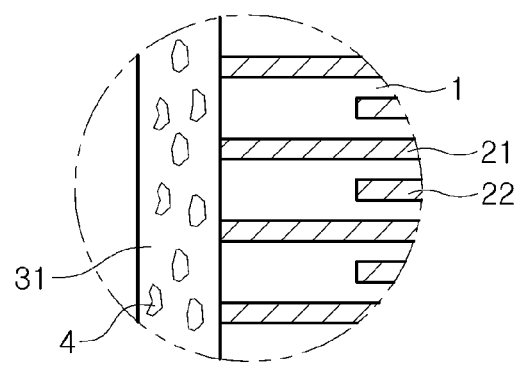
FIG. 3 is an enlarged view of part S of FIG. 2.

FIG. 3 is an enlarged view of part S of FIG. 2.

Figure 5:
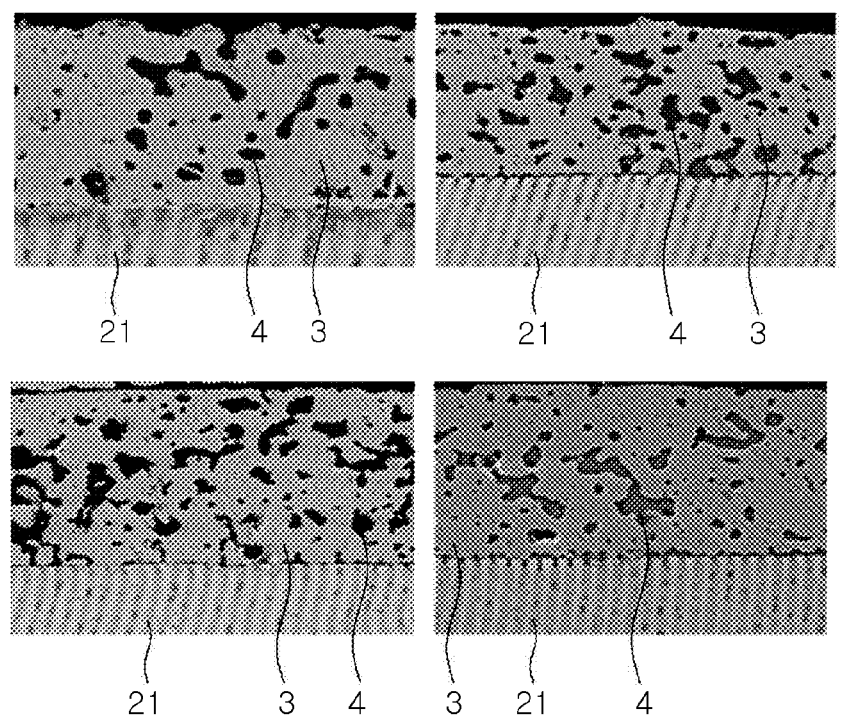
FIG. 5 is a scanning electron microscope (SEM) photograph of a cross-section of an external electrode of the multi-layered ceramic capacitor according to the embodiment of the present invention.

FIG. 5 is a scanning electron microscope (SEM) photograph of a cross-section of an external electrode of the multi-layered ceramic capacitor according to the embodiment of the present invention.

Referring to FIGS. 1 through 3 and FIG. 5, a multi-layered ceramic electronic component according to the embodiment of the present invention may include a ceramic body 10 including a dielectric layer 1; first and second internal electrodes 21 and 22 disposed within the ceramic body 10 so as to face each other, having the dielectric layer 1 therebetween; and a first external electrode 31 electrically connected to the first internal electrodes 21 and a second external electrode 32 electrically connected to the second internal electrodes 22, wherein the first and second external electrodes 31 and 32 include a conductive metal and glass 3 and may further include a second phase material 4 occupying an area of 1 to 80% with respect to an area of the glass 3 in the first and second external electrodes 31 and 32.

Hereinafter, the multi-layered ceramic electronic component according to the embodiment of the present invention will be described. Particularly, a multi-layered ceramic capacitor will be described. However, the present invention is not limited thereto.

In the multi-layered ceramic capacitor according to the embodiment of the present invention, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' is the same as a direction in which dielectric layers are multi-layered, that is, the 'multi-layered direction'.

According to the embodiment of the present invention, a raw material forming the dielectric layer 1 is not particularly limited as long as sufficient capacitance may be obtained, but may be, for example, a barium titanate ($BaTiO_3$) powder.

In a material forming the dielectric layer 1, various ceramic additives, organic solvents, plasticizers, binders, dispersing agents, and the like, may be applied to a powder such as a barium titanate ($BaTiO_3$) powder, or the like, according to the purpose of the present invention.

A material forming the first and second internal electrodes 21 and 22 is not particularly limited, but may be a conductive paste including at least one of, for example, silver (Ag), lead (Pb), platinum (Pt), nickel (Ni), and copper (Cu).

The multi-layered ceramic capacitor according to the embodiment of the present invention may include the first external electrode 31 electrically connected to the first internal electrodes 21 and the second external electrode 32 electrically connected to second internal electrodes 22.

The first and second external electrodes 31 and 32 may be electrically connected to the first and second internal electrodes 21 and 22 in order to form the capacitance, and the second external electrode 32 may be connected to an electric potential different from the first external electrode 31.

According to the embodiment of the present invention, the first and second external electrodes 31 and 32 may include the conductive metal and the glass 3 and further include the second phase material 4 occupying an area of 1 to 80% with respect to an area of the glass 3 in the first and second external electrodes 31 and 32.

The conductive metal is not particularly limited, but may be, for example, at least one selected from a group consisting of copper (Cu), nickel (Ni), silver (Ag), and sliver-palladium (Ag—Pd).

The glass is not particularly limited as long as it is generally used, for example, may include a silicon-based or boron-based oxide.

The second phase material 4 may include at least one selected from a group consisting of barium (Ba), silicon (Si), zinc (Zn), and calcium (Ca), but is not limited thereto.

Referring to FIG. 5, the second phase material 4 is not particularly limited. For example, the second phase material may have at least one of an acicular shape, a plate shape, a spherical shape, an oval shape, and an amorphous shape.

A position at which the areas occupied by the glass 3 and the second phase material 4 are measured is not particularly limited. For example, the position may be the entire region of the first and second external electrodes 31 and 32 on a cross-section in length-thickness directions of the ceramic body 10.

A method of measuring the areas occupied by the glass 3 and the second phase material 4 is not particularly limited. For example, the area occupied by the second phase material 4 may be measured as a ratio of the area occupied by the second phase material 4 with respect to the area of the glass in a region of 150 μm×100 μm (length×width) in the entire region of the first and second external electrodes 31 and 32.

For example, the ratio of the area occupied by the second phase material 4 to the area of the glass in the entire region of the first and second external electrodes 31 and 32 may be measured from an image obtained by scanning a cross section of the ceramic body 10 in the length direction using a scanning electron microscope (SEM) as shown in FIG. 2.

More specifically, the ratio of the area occupied by the second phase material to the area of the glass may be calculated by measuring the area occupied by the second phase material and the area of the glass in the external electrode region extracted from the image obtained by scanning the cross section of the ceramic body in the length and thickness (L-T) directions taken along a central portion of the ceramic body 10 in the width (W) direction using the scanning electron microscope (SEM) as shown in FIG. 2.

The area occupied by the second phase material satisfies 1 to 80% with respect to the area of the glass, such that fluidity of the glass may be controlled at relatively high temperatures. Therefore, the contact property between the external electrode and the ceramic body may be improved, and generation of the blister may be prevented, whereby the multi-layered ceramic electronic component having improved reliability may be implemented.

Generally, the glass may promote sintering of the conductive metal, serve to adhere the ceramic body 10 and the external electrode to each other, and be filled in particularly voids that are not filled with the conductive metal to thereby serve to implement a sealing property of the ceramic body.

Meanwhile, in accordance with the thinness of the external electrode, in order to form a compact external electrode, a method of using copper powder having fine particles, a method of using a glass powder having fine particles, a method of increasing an electrode firing temperature, and the like, may be used.

However, in the case in which the fine copper powder is used, a contact property between the ceramic body and the external electrode and compactness of the external electrode may be improved, but times required for reaching a firing initiation temperature and firing completion temperature are relatively short, such that a blister defect generated since gas generated at high temperatures is not emitted may be generated.

In addition, in the case of a relatively low capacitance multi-layered ceramic capacitor, a surface state of an exposed nickel internal electrode after polishing may be bad due to a thick thickness of the internal dielectric layer, such that it may be difficult to produce a copper-nickel alloy layer that should be formed at the time of forming the external electrode.

Therefore, it may be difficult to implement a contact property between a ceramic body and the external electrode, and in order to solve this defect, a high firing temperature has been required.

However, in the case in which the firing temperature is relatively high, the glass is softened before the copper-nickel alloy layer is formed to move to a boundary surface between the ceramic body and the external electrode, such that the contact property between the ceramic body and the external electrode may be deteriorated.

According to the embodiment of the present invention, the area occupied by the second phase material satisfies 1 to 80% with respect to the area of the glass, such that the fluidity of the glass at the high temperature may be reduced.

As described above, a sintering rate of the glass is controlled to promote emission of gas generated during a firing process, such that generation of the blister defect may be prevented.

In addition, in the case of the low capacitance multi-layered ceramic capacitor, since the surface state of the exposed internal electrode is not good due to the thick thickness of the dielectric layer, relatively high heat energy is required for forming the copper-nickel alloy at the time of firing the electrode.

However, in the case in which glass having high fluidity at the high temperature is used, since the glass moves to an interface between the ceramic body and the external electrode in a state in which the copper-nickel alloy is not strongly bonded, formation of the copper-nickel alloy may be hindered, thereby causing a contact defect.

According to the embodiment of the present invention, the area occupied by the second phase material satisfies 1 to 80% with respect to the area of the glass, such that the fluidity of the glass at the high temperature may be reduced, thereby allowing the glass to move after the copper-nickel alloy is strongly formed.

Therefore, the contact property between the ceramic body and the external electrode may be improved simultaneously with implementing the compactness of the external electrode, thereby preventing the reliability from being deteriorated.

In the case in which the area occupied by the second phase material is smaller than 1% with respect to the area of the glass, since a content of the second phase material is relatively low, an effect of reducing the blister defect according to the embodiment of the present invention may not be obtained, and the reliability may be deteriorated due to the contact defect.

Further, in the case in which the area occupied by the second phase material is larger than 80% with respect to the area of the glass, since the content of the second phase material is excessively high, it may be difficult to implement the compactness of the external electrode through the glass, such that the reliability may be deteriorated due to infiltration of a plating solution.

Here, determination of the reliability may be performed by a method of evaluating the reliability at a rated voltage (or a voltage higher than the rated voltage) under a relatively high temperature and high humidity condition and evaluating the reliability while changing the rated voltage at the high temperature and may be performed by a change in an insulation resistance value in the chip such as the capacitor, which is an insulator. In the case in which defects such as a crack, or the like, are generated, the insulation resistance value increases, and accordingly, the defect may be generated.

Contact properties for capacitance formation are a standard for determining connectivity between the internal electrode and the external electrode. All of the multi-layered ceramic capacitor has a rated capacitance, but in the case in which the connectivity between the internal electrode and the external electrode is reduced, the capacitance may be lower than the rated capacitance, through which the contact property may be determined. Generally, in the case in which the content of the glass, which is a non-conductor, is relatively high, the connectivity between the internal electrode and the external electrode may be deteriorated.

According to the embodiment of the present invention, a content ratio of the glass to the conductive metal is not particularly limited. For example, the content ratio may be 0.3 to 2.0.

The first and second external electrodes 31 and 32 include the glass having a content of 0.3 to 2.0 with respect to the content of the conductive metal, such that the ceramic body 10 may have an excellent sealing property even in the case that the content of glass is significantly increased and thus the external electrode is thinned.

Therefore, in the multi-layered ceramic capacitor according to the embodiment of the present invention, high temperature insulation resistance (IR) characteristics are improved, such that the reliability may be excellent.

Further, even in the case in which the thickness of a corner part of the external electrode becomes relatively thin, since the content of glass increases, the compactness of the corner portion increases, whereby deterioration of reliability due to the infiltration of the plating solution may be prevented.

In the case in which the content of the glass is lower than 0.3 with respect to the content of the conductive metal, since the content of the glass is low, the sealing property of the ceramic body may not be obtained.

Further, in the case in which the content of the glass is higher than 2.0 based on the content of the conductive metal, since the content of the glass is excessively high, the glass may move the conductive metal, such that tearing of the corner part of the external electrode may be generated. In addition, a defect in which the plating is not performed may be generated due to the exudation of the glass, and the contact properties for capacitance formation may be deteriorated due to deterioration of the connectivity between the internal electrode and the external electrode.

The first and second external electrodes are not particularly limited, but may include, for example, a conductive metal particle having an average particle size of 0.3 μm or less.

Figure 4:
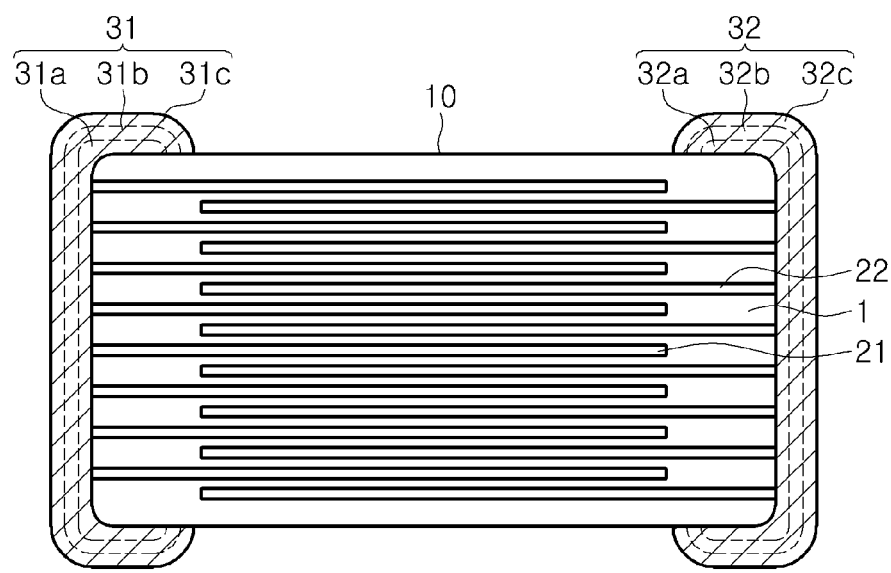
FIG. 4 is a cross-sectional view taken along line A-A' of FIG. 1 according to another embodiment of the present invention.

FIG. 4 is a cross-sectional view taken along line A-A' of FIG. 1 according to another embodiment of the present invention.

Referring to FIG. 4, a multi-layered ceramic electronic component according to another embodiment of the present invention may include a ceramic body 10 including a dielectric layer 1; first and second internal electrodes 21 and 22 disposed within the ceramic body 10 so as to face each other, having the dielectric layer 1 therebetween; and a first external electrode 31 electrically connected to the first internal electrodes 21 and a second external electrode 32 electrically connected to the second internal electrodes 22, wherein the first and second external electrodes 31 and 32 include a conductive metal and glass 3 and may further include a second phase material 4 occupying an area of 1 to 80% with respect to an area of the glass 3 in a central portion region 31b or 32b when at least one of the first and second external electrodes 31 and 32 is trisect in the thickness direction.

The conductive metal may be at least one selected from a group consisting of copper (Cu), nickel (Ni), silver (Ag), and sliver-palladium (Ag—Pd).

In describing the multi-layered ceramic component according to another embodiment of the present invention, a description overlapped with the description of the multi-layered ceramic electronic component according to the embodiment of the present invention described above will be omitted.

A measurement position of areas occupied by the glass 3 and the second phase material 4 is not particularly limited, but may be, for example, the central portion region 31b or 32b provided when the first and second external electrodes 31 and 32 are trisected in the thickness direction.

Here, thicknesses of the first and second external electrodes may refer to thicknesses at which the first and second external electrodes are formed on both end portions of the ceramic body 10 in the length direction and thicknesses at which the first and second external electrodes are formed on upper and lower surfaces of the ceramic body 10 in the thickness direction.

A method of measuring the areas occupied by the glass 3 and the second phase material 4 is not particularly limited. For example, the area occupied by the glass 3 may be measured as a ratio of the area occupied by the glass with respect to an area of 150 μm×100 μm (length×width) in the central portion region 31b or 32b.

For example, when the first and second external electrodes 31 and 32 are trisected in the thickness direction, the areas occupied by the glass 3 and the second phase material 4 in the central portion regions 31b and 32b may be measured from an image obtained by scanning a cross section of the ceramic body 10 in the length direction using a scanning electron microscope (SEM) as shown in FIG. 2.

More specifically, the ratio of the area occupied by the second phase material 4 to the area of the glass 3 may be calculated by measuring the areas occupied by the glass 3 and the second phase material 4 in the external electrode cross-section extracted from the image obtained by scanning the cross section of the ceramic body 10 in the length and thickness (L-T) directions taken along a central portion of the ceramic body 10 in the width (W) direction using the scanning electron microscope (SEM) as shown in FIG. 2.

The area occupied by the second phase material satisfies 1 to 80% with respect to the area of the glass, such that fluidity of the glass at the high temperature may be controlled. Therefore, the contact property between the external electrode and the ceramic body may be improved, and generation of the blister may be blocked, whereby the multi-layered ceramic electronic component having improved reliability may be implemented.

Hereinafter, a method of manufacturing a multi-layered ceramic electronic component according to another embodiment of the present invention will be described in detail. Particularly, a multi-layered ceramic capacitor will be described. However, the present invention is not limited thereto.

First, the ceramic body 10 including the dielectric layer 1 and the first and second internal electrodes 21 and 22 disposed so as to face each other, having the dielectric layer 1 therebetween, may be prepared.

The dielectric layer 1 may be formed of a ceramic green sheet prepared to have a thickness of several μm by applying and drying slurry formed by mixing a powder such as a barium titanate ($BaTiO_3$) powder, or the like, with a ceramic additive, an organic solvent, a plasticizer, a binder, and a dispersing agent using a basket mill, onto a carrier film.

Then, an internal electrode layer may be formed by dispensing the conductive paste on the green sheet and moving a squeegee in one side direction.

Here, the conductive paste may be formed of one material of a noble metal material such as silver (Ag), lead (Pb), platinum (Pt), or the like, and a metal such as nickel (Ni), copper (Cu), or a mixture of at least two materials thereof.

After the internal electrode layer is formed as described above, a multilayer body may be formed by separating the green sheet from the carrier film and then multi-layering a plurality of green sheets on each other, in an overlapped scheme.

Then, a ceramic body may be manufactured by compressing the green sheet multilayer body at high temperatures and pressure and then cutting the compressed sheet multilayer body so as to have a predetermined size through a cutting process.

Next, an external electrode paste including a conductive metal including a 10 to 90 parts by weight of a conductive metal particle having an average particle size of 0.3 μm or less and glass having a content of 0.3 to 2.0 with respect to the content of the conductive metal may be prepared.

The conductive metal may be at least one selected from a group consisting of copper (Cu), nickel (Ni), silver (Ag), and sliver-palladium (Ag—Pd).

Then, the external electrode paste may be applied to the ceramic body 10 so as to be electrically connected to the first and second internal electrodes 21 and 22.

Finally, first and second external electrodes 31 and 32 may be formed by firing the ceramic body 10.

An operation of firing the ceramic body 10 may be performed at a temperature of 750° C. or less.

Hereafter, although the present invention will be described in detail with reference to Comparative Example and Inventive Example, the present invention is not limited thereto.

In Inventive Example, capacitance and a blister defect generation ratio were tested with respect to a multi-layered ceramic capacitor formed so that an area occupied by a second phase material is 1 to 80% with respect to an area of the glass in first and second external electrodes.

The multi-layered ceramic capacitor of Inventive Example was manufactured as follows.

First, slurry containing a powder such as a barium titanate ($BaTiO_3$) powder, or the like, was applied and dried onto a carrier film to prepare a plurality of ceramic green sheets, thereby forming a dielectric layer.

Next, a conductive paste for an internal electrode in which an average size of a nickel particle is 0.05 to 0.2 μm was prepared.

The conductive paste for an internal electrode was applied to the green sheet by a screen printing method to thereby form an internal electrode and 50 layers of green sheets were then multi-layered to thereby form a multilayer body.

Then, the multilayer body was compressed and cut to thereby form a chip having a 2012-standard size, and the chip was fired at a temperature of 1050 to 1200° C. under a reducing atmosphere in which $H_2$ is 0.1% or less.

Next, first and second external electrodes were formed so that the area occupied by the second phase material is 1 to 80% with respect to the area of the glass in the external electrode and then a plating process, or the like, was performed to thereby manufacture a multi-layered ceramic capacitor.

In Comparative Example, a multi-layered ceramic capacitor was manufactured under the same condition as that in Inventive Example except that first and second external electrodes were manufactured so that a second phase material was not formed in the external electrode.

Figure 6:
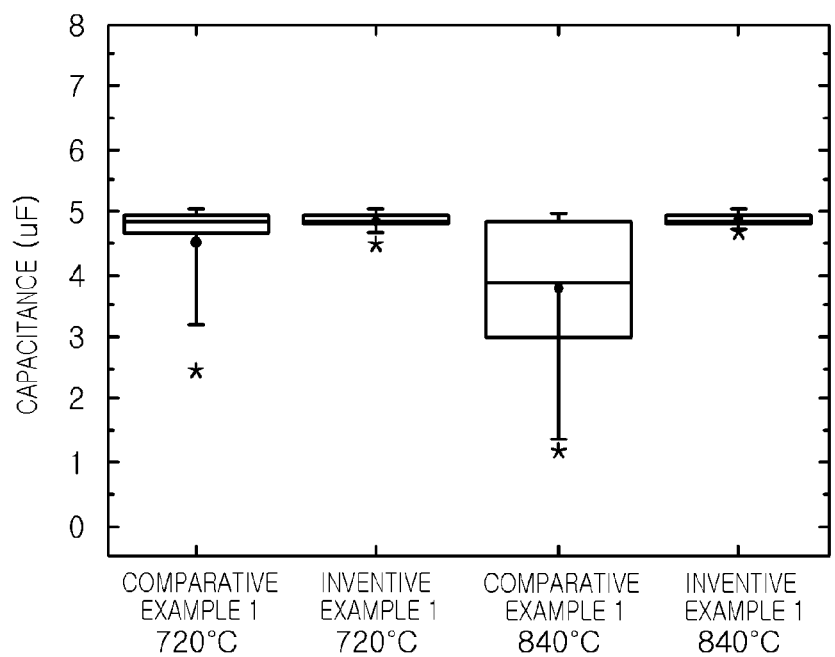
FIG. 6 is a graph showing changes in capacitances in Inventive Example and in Comparative Example.

FIG. 6 is a graph showing changes in capacitances in Inventive Example and Comparative Example.

Figure 7:
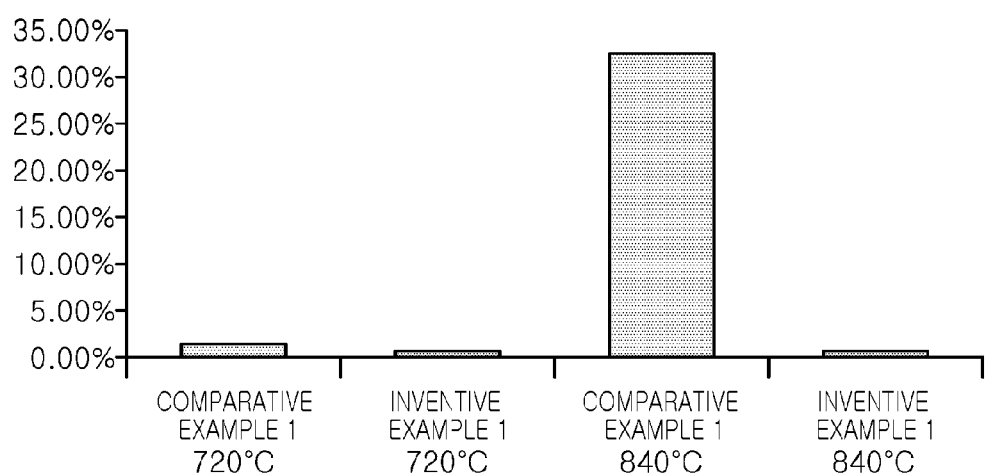
FIG. 7 is a graph showing a blister generation ratio in Inventive Example and Comparative Example.

FIG. 7 is a graph showing a blister generation ratio in Inventive Example and in Comparative Example.

Referring to FIG. 6, it may be appreciated that in Comparative Example 1 in which firing is performed at a low temperature of 720° C., reduction of the capacitance due to a contact defect between the ceramic body and the external electrode is confirmed, and reduction of the capacitance is further significant in the case in which the firing is performed at a high temperature of 840° C.

On the other hand, it may be appreciated that in Inventive Example 1 in which the firing is performed at a low temperature of 720° C., a copper-nickel alloy is strongly formed, such that contact property between the ceramic body and the external electrode may be good and capacitance may be excellent, and the capacitance may also be normally implemented in the case in which the firing is performed at a high temperature of 840° C.

Referring to FIG. 7, it may be appreciated that in Comparative Example 1 in which the firing is performed at a low temperature of 720° C., the compactness of the electrode is not completely implemented and the blister defect is not generated, but in the case in which the firing is performed at a high temperature of 840° C., the blister defect is generated due to fast sintering.

On the other hand, it may be appreciated that in Inventive Example 1 in which the firing is performed at a low temperature of 720° C., the compactness of the electrode is not completely implemented, such that the blister defect is not generated, and in the case in which the firing is performed at a high temperature of 840° C., since a rate of implementing compactness is relatively slow, the sintering is finished after high temperature gas is completely emitted, such that the blister defect is not generated.

As set forth above, according to the embodiments of the present invention, the fluidity of the glass at the relatively high temperature may be controlled by forming the second phase in the glass region to prepare the external electrode, such that the contact property between the external electrode and the ceramic body may be improved, and the generation of the blister may be blocked. Therefore, the multi-layered ceramic electronic component having the improved reliability may be implemented.

While the present invention has been shown and described in connection with the embodiments, it will be apparent to those skilled in the art that modifications and variations can be made without departing from the spirit and scope of the invention as defined by the appended claims.

What is claimed is:

1. A multi-layered ceramic electronic component comprising:
    a ceramic body including a dielectric layer;
    first and second internal electrodes disposed within the ceramic body so as to face each other, having the dielectric layer interposed therebetween; and
    a first external electrode electrically connected to the first internal electrodes and a second external electrode electrically connected to the second internal electrodes,
    wherein the first and second external electrodes include a conductive metal and glass and further include a second phase material occupying an area of 1 to 80% with respect to an area of glass in the first and second external electrodes.

2. The multi-layered ceramic electronic component of claim 1, wherein the second phase material is an oxide including at least one selected from a group consisting of barium (Ba), silicon (Si), zinc (Zn), and calcium (Ca).

3. The multi-layered ceramic electronic component of claim 1, wherein the second phase material has at least one of an acicular shape, a plate shape, a spherical shape, an oval shape, and an amorphous shape.

4. The multi-layered ceramic electronic component of claim 1, wherein a content ratio of the glass to the content of the conductive metal is 0.3 to 2.0.

5. The multi-layered ceramic electronic component of claim 1, wherein the first and second external electrodes include a conductive metal particle having an average particle size of 0.3 μm or less.

6. The multi-layered ceramic electronic component of claim 1, wherein the conductive metal is at least one selected from a group consisting of copper (Cu), nickel (Ni), silver (Ag), and sliver-palladium (Ag—Pd).

7. A multi-layered ceramic electronic component comprising:
    a ceramic body including a dielectric layer;
    first and second internal electrodes disposed within the ceramic body so as to face each other, having the dielectric layer interposed therebetween;
    a first external electrode electrically connected to the first internal electrodes and a second external electrode electrically connected to the second internal electrodes,
    wherein the first and second external electrodes include a conductive metal and glass and further include a second phase material occupying an area of 1 to 80% with respect to an area of glass in a central portion region when at least one of the first and second external electrodes is trisected in a thickness direction.

8. The multi-layered ceramic electronic component of claim 7, wherein the second phase material is an oxide including at least one selected from a group consisting of barium (Ba), silicon (Si), zinc (Zn), and calcium (Ca).

9. The multi-layered ceramic electronic component of claim 7, wherein the second phase material has at least one of an acicular shape, a plate shape, a spherical shape, an oval shape, and an amorphous shape.

10. The multi-layered ceramic electronic component of claim 7, wherein a content ratio of the glass to the content of the conductive metal is 0.3 to 2.0.

11. The multi-layered ceramic electronic component of claim 7, wherein the first and second external electrodes include a conductive metal particle having an average particle size of 0.3 µm or less.

12. The multi-layered ceramic electronic component of claim 7, wherein the conductive metal is at least one selected from a group consisting of copper (Cu), nickel (Ni), silver (Ag), and sliver-palladium (Ag—Pd).

* * * * *